United States Patent [19]
Kato et al.

[11] Patent Number: 5,828,435
[45] Date of Patent: Oct. 27, 1998

[54] METHOD FOR FABRICATING A LIQUID CRYSTAL CELL COMPRISES FORMING A SEAL MEMBER AFTER ALIGNING THE SUBSTRATES

[75] Inventors: Yoshinori Kato, Kyungki-do; Kun-Jong Lee, Seoul, both of Rep. of Korea

[73] Assignee: Samsung Electronics Co., Ltd., Suwon, Rep. of Korea

[21] Appl. No.: 717,187

[22] Filed: Sep. 20, 1996

[30] Foreign Application Priority Data

Sep. 21, 1995 [KR] Rep. of Korea ...................... 95-31217

[51] Int. Cl.⁶ ............................ G02F 1/1339; G02F 1/13
[52] U.S. Cl. ........................... 349/190; 349/153; 349/187
[58] Field of Search ................................... 349/187, 190, 349/153

[56] References Cited

U.S. PATENT DOCUMENTS

| 3,952,405 | 4/1976 | Vest .......................................... | 349/190 |
| 5,263,888 | 11/1993 | Ishihara et al. ........................... | 349/190 |
| 5,410,423 | 4/1995 | Furushima et al. ...................... | 349/190 |
| 5,706,069 | 1/1998 | Hermens et al. ........................ | 349/190 |

FOREIGN PATENT DOCUMENTS

| 5-107533 | 4/1993 | Japan . |
| 6-43474 | 2/1994 | Japan . |

Primary Examiner—William L. Sikes
Assistant Examiner—Toan Ton
Attorney, Agent, or Firm—Jones & Volentine, L.L.P.

[57] ABSTRACT

The present invention relates to a liquid crystal cell and a fabricating method thereof, more specifically, relates to a method for combining a pair of glass substrates and to a liquid crystal cell made thereby. A fabricating method according to the present invention includes steps of spreading spacers on an inner surface of a first transparent substrate provided with electrodes, and forming a seal member along the boundary edge of a second transparent substrate provided with electrodes after aligning the second substrate to be opposite to the first substrate. As the seal member is formed while the first and the second substrates are held under pressure, no special equipment is needed and no additional step of pressing is necessary after aligning the substrates. Furthermore, the seal member occupies smaller area in the alignment surfaces of the cell compared to a conventional art. As a reduced pressure is applied during aligning the substrates, adjusting the position of the substrates is easy and the movement of the substrates is reduced.

19 Claims, 5 Drawing Sheets

METHOD FOR FABRICATING A LIQUID CRYSTAL CELL COMPRISES FORMING A SEAL MEMBER AFTER ALIGNING THE SUBSTRATES

BACKGROUND OF THE INVENTION

The present invention relates to a liquid crystal cell and a method for fabricating the same. More specifically, the present invention relates to a method of combining two pieces of plate for a liquid crystal cell and the liquid crystal cell fabricated by this method.

A conventional liquid crystal cell includes a pair of substrates both provided with electrodes, spacers being spread between the two substrates, and a seal member formed along the boundary edge of the substrates for joining the two substrates and for containing liquid crystal material within the gap between the substrates.

A conventional liquid crystal cell structure and a method for fabricating this conventional liquid crystal cell will be described in conjunction with FIGS. 1–3. FIG. 1 is a schematic diagram of a cross-sectional view for illustrating the structure of a conventional liquid crystal cell.

As shown in FIG. 1, a conventional liquid crystal cell comprises a pair of substrates 2 and 2' each containing transparent electrodes 3, a pair of alignment layers 4, a plurality of seal members 5, a plurality of spacers 6, and a liquid crystal material 7. The substrates are oriented parallel to each other with the surfaces containing the transparent electrodes 3 opposite each other. The transparent electrodes 3 can be pixel electrodes, common electrodes, or the like. The alignment layers 4 are formed on the opposing surfaces of the glass substrates 2 and 2', covering the transparent electrodes. The alignment layers 4 are formed to enable the proper alignment of the liquid crystal material 7. The spacers 6 are generally spherical in shape and serve to separate the pair of glass substrates 2 and 2' by a predetermined distance, called the cell gap. The liquid crystal material 7 is filled within the cell gap between the glass substrates 2 and 2'. The seal member 5 are then formed along the boundary edge of the aligned substrates 2 and 2' to seal the liquid crystal material 7 within cell gap. Finally, polarizers 1 are formed on the outer surfaces of the substrates 2 and 2' to complete the liquid cystal cells. Conventional liquid crystal cells are well known in the prior art as shown in.

FIG. 2 is a flow chart for illustrating a fabricating procedure in a prior art. As shown in FIG. 2, the pair of glass substrates 2 and 2' containing transparent electrodes 3 on the respective surface are first cleansed (step 202). The surfaces of the substrates 2 and 2' are then coated with a resin, such as polyimide, by spinning method (step 204), which is then heated to evaporate the solvents and to polymerize the resin. This curing of the resin (step 206) results in the formation of the alignment layer 4.

The alignment layer 4 alone cannot effect the liquid crystal molecules to be aligned, and therefore, rubbing step is necessary, wherein the alignment layers 4 of the substrates 2 and 2' are rubbed in a uniform direction (step 208). As velvet cloths are commonly used for this rubbing purpose, the fibrous impurities stick on the surface of the substrates 2 and 2', necessitating further cleaning after rubbing (step 210).

A seal member 5 is applied on one of the surface of the substrates 2 and 2' along the boundary edge, functioning as an adhesive and a sealant to keep a liquid crystal from leaking out. The seal member 5 is formed, in general, by printing a thermosetting resin through a screen mask (step 212). A filling port for filling liquid crystal should be provided in this printing step.

It is required in the printing step that the seal member 5 be formed to an accurate width and height as well as in a precise position. For example, a width is preferably kept within the range of 0.3±0.1 mm, a height in the range of 30±10 $\mu$m, and a position in the range of ±0.5 mm deviation. When the accuracy of forming the seal member is insufficient, the substrates 2 and 2' may fail to be combined completely or the seal member 5 may intrude into a displaying area where pixel electrodes are located. Therefore, screen masks and printing equipment are required to have features of high precision and such equipment is expensive.

A seal dispenser is also commonly used for printing the seal member 5, using a syringe-type dispenser to dispense the seal member 5. In order to keep a high precision of the seal dispenser as required, it is necessary to use a sophisticated control system, which is capable of managing and adjusting a distance between the substrates 2 and 2' and the dispenser, pressure, temperature, and a flow rate of the seal member. The cost of such a dispenser is also high.

After printing the seal member 5 (step 212), a plurality of spacers 6, each the same size, are spread onto the substrate 2' for maintaining the gap between the two substrates 2 and 2' when assembled (step 214).

The two substrates 2 and 2' are then combined in alignment (step 216) and subjected to a pressure of about 0.5 kg/cm$^2$ (step 218) to press the seal member 5 from its initial height of about 30 $\mu$m to the height of the plurality of spacers 6, approximately 5$\mu$m. In this state, the seal member 5 is then hardened by heating (step 220), and consequently the seal member 5 is fixed only within the gap of a pair of substrates 2 and 2' in alignment.

Liquid crystal is then filled into the void cell obtained according to above-described process, through a procedure of putting the void cell and a liquid crystal in an evacuated chamber, dipping a filling port of the cell into the liquid crystal, and releasing the pressure in the chamber to the atmosphere (step 222).

The cell gap after the filling of liquid crystal is larger than the diameter of spacers 6 and is not uniform due to the unevenness and distortion of the substrates 2 and 2'. To obtain a uniform cell gap, an end seal process is carried out, wherein the unevenness and distortion of the substrates 2 and 2' is eliminated by pressurizing both surfaces of the liquid crystal cell at about 0.5 kg/cm$^2$ and then the injection port is shut off (step 224).

After the liquid crystal cell is washed and rinsed (step 226), a polarizer 1 is attached on each outer surface of the substrates 2 and 2' (step 228).

Production of a conventional liquid crystal call as described above requires precision equipment, which can be very expensive. For example, the step of forming a seal member on one of the substrates requires a printer and screen mask, both of which are expensive.

Moreover, in an actual assembling process according to this conventional method, when a pair of glass substrates are aligned and pressurized, the substrates can easily slide. This sliding can damage the pixels on the substrate, which in turn can allow light to leak out during operation, causing the resulting display device to malfunction.

Another drawback of conventional arts is that forming a seal member along the boundary edge of the substrates requires a certain area occupied by the seal member, reducing the actual display area.

SUMMARY OF THE INVENTION

It is an object of the present invention to provide a liquid crystal cell and a fabricating method thereof, in order to improve drawbacks according to prior arts such as requirement of expensive equipment, unstable fabricating process during assembling the substrates, and reduced display area due to the boundary edge of the substrates being occupied by a seal member.

The features of a preferred embodiment according to the present invention, to achieve these and other objects, include a fabricating procedure that forming a seal member is preceded by spreading a plurality of spacers and aligning a pair of substrates to be sealed.

A fabricating method of a liquid crystal cell according to a preferred embodiment of the present invention includes a first step of spreading the spacers upon an inner surface of a transparent first substrate with electrodes, and a second step of laying a transparent second substrate with electrodes on the inner surface of the first substrate, thereafter forming a seal member along the boundary of the second substrate.

In these steps above, the first substrate is preferred to have a larger dimension than the second substrate, and at least one side of the second substrate can be positioned at inner area of the sides of the first substrate, or at least one side of the first substrate can be in alignment with one side of the second substrate.

Further, the surface of one side area of at least one of the substrates is preferred to have unevenness, and the enlarged surface area enhances the pair of substrates to be effectively attached by the seal member. This unevenness can be formed by cutting a corner of a substrate and the cut area can make a certain angle with the opposing substrate. In this case, in the first substrate, one or two comers made by the first substrate and a side can be cut, and in the second substrate, every comers made by the second substrate and a side can be cut.

Forming a seal member can be accomplished with the substrates being pressurized in the range of 0.05–0.5 kg/cm$^2$, relatively low pressure compared to a prior art.

A seal member is preferably an ultraviolet-curing type so that it can be easily applied by means of a simple dispenser similar to a syringe and is cost-effective. Other materials can be used for a seal member such as, for example, an epoxy resin or a tape.

The second step preferably includes: a process of holding the first and second substrates under vacuum on the first and second stages respectively, a process of forming a seal member by pressurizing and aligning the second substrate over the first substrate, and a process of releasing the pressure on the second substrate, releasing the vacuum to hold the substrates, then separating the assembled substrates from the first and second stages. The second stage is preferably smaller than the second substrate by 1 mm to 10 mm.

After the second step, a further step includes: filling a liquid crystal into the void space of the assembled substrates by injecting the liquid crystal through a filling port, both planes of the substrates being pressed and simultaneously eliminating the roughness and distortion of the substrates, the filling port being sealed thereafter.

The liquid crystal cell, formed by the above-described process, includes the transparent first and second substrates provided with electrodes and aligned opposite of each other, a plurality of spacers being spread within the gap between the substrates, and a seal member being formed along the boundary edge area of the substrates.

A fabricating method of a preferred embodiment according to the present invention includes consecutive steps of: aligning a pair of the substrates, forming a seal member along the boundary of the substrates which are kept pressurized simultaneously, consequently eliminating the requirement of using high precision equipment, such as printer and screen mask, enabling to use a simple dispenser of low cost, and reducing the area occupied by a seal member within the substrates compared to a prior art.

Furthermore, a pressing step after aligning the substrates is eliminated and a low pressure in aligning the substrates facilitates adjusting the alignment of the substrates as well as increasing the stability of the substrates during fabrication.

These and other advantages of the present invention will become better understood in he following description taken in conjunction with the accompanying drawings.

DETAILED DESCRIPTION OF THE PREFERRED EMBODIMENTS

Reference will now be made to a preferred embodiment of the present invention. This preferred embodiment will be described with reference to FIGS. 3–9.

In a liquid crystal display in accordance with a preferred embodiment of the current invention, hundreds of electrodes are formed on opposite surfaces of a pair of glass substrates in stripes having a width of 300 μm and a pitch of 330 μm between electrodes. The electrically conductive substance for the transparent electrodes is a thin film of indium tin oxide (ITO) commonly used in a liquid crystal display device.

Figure 5:
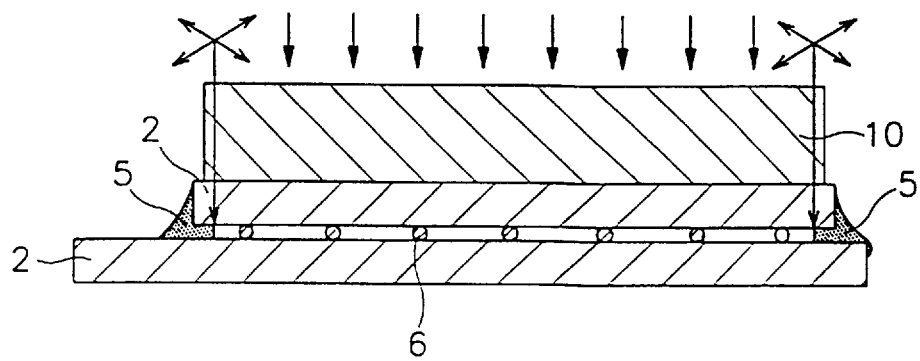
FIG. 5 is a side view illustrating a fabricating procedure of an embodiment according to the present invention.
Figure 6:
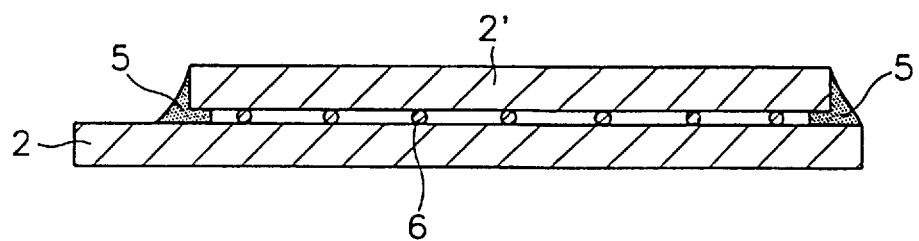
FIG. 6 to FIG. 8 are side views illustrating other embodiments according to the present invention.
Figure 7:
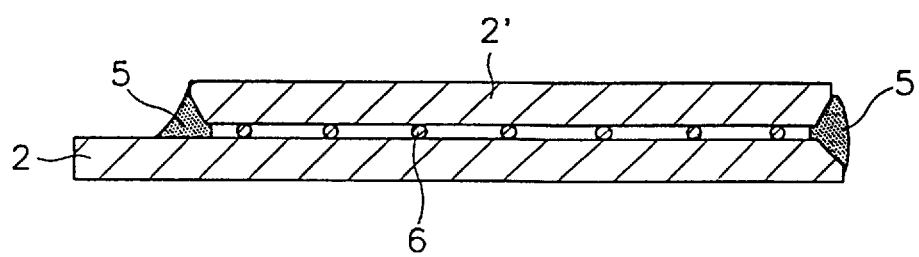

As shown in FIGS. 5–9, the opposite surfaces of the substrates 2 and 2' and their side walls can be formed perpendicular to each other as in common electrode boards, or can be formed in irregular aggles to each other. For example, the opposite surfaces of substrates 2 and 2' and the side wall can be inclined, or bevelled, from 30 degrees to 45 degrees after being cut by a grinder. FIG. 7, for example, shows an embodiment in which both of the side walls of the upper substrate 2' are bevelled, and in which one side wall of the lower substrate 2 is bevelled.

A preferred embodiment of the process for creating a liquid crystal display, as shown in FIGS. 4–8, will now be described with reference to FIG. 3.

Figure 1:
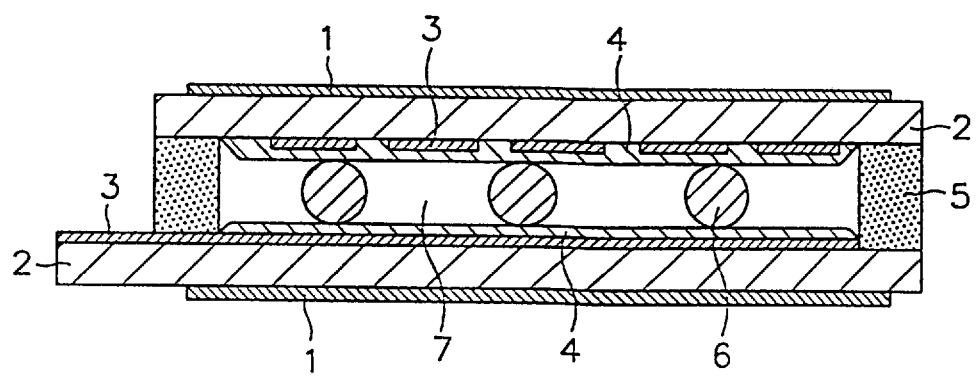
FIG. 1 is a schematic diagram of a cross-sectional view illustrating a structure of a conventional liquid crystal cell.
Figure 2:
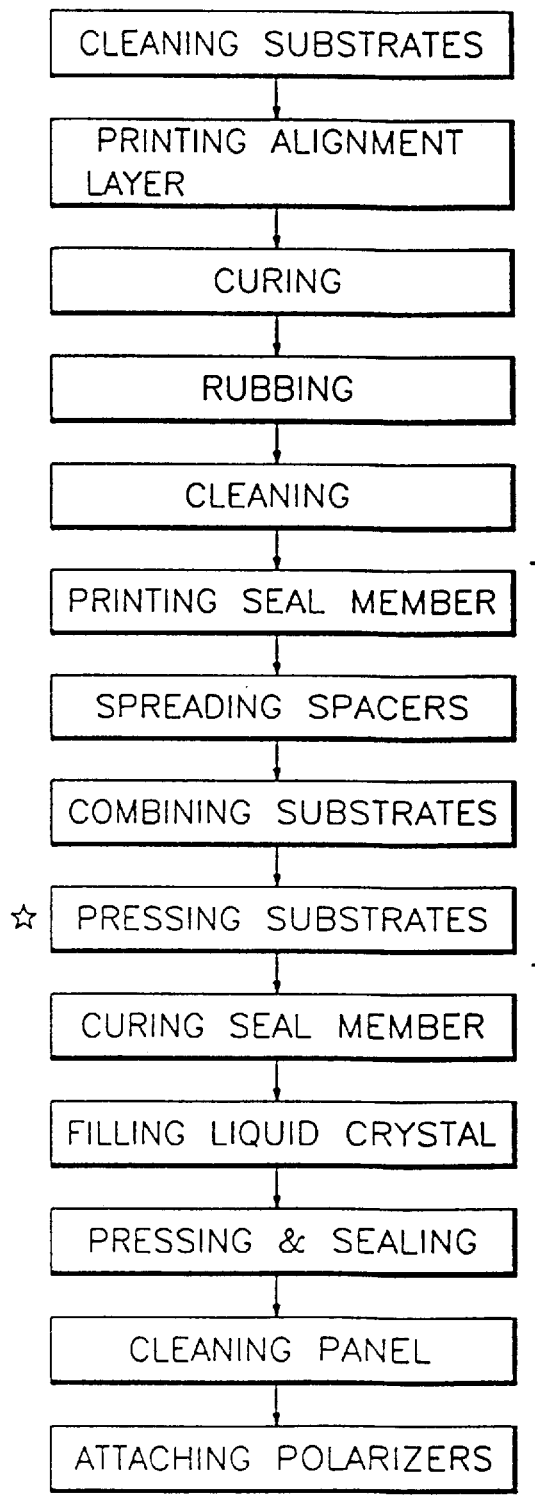
FIG. 2 is a flow chart illustrating a fabricating procedure in a prior art.
Figure 3:
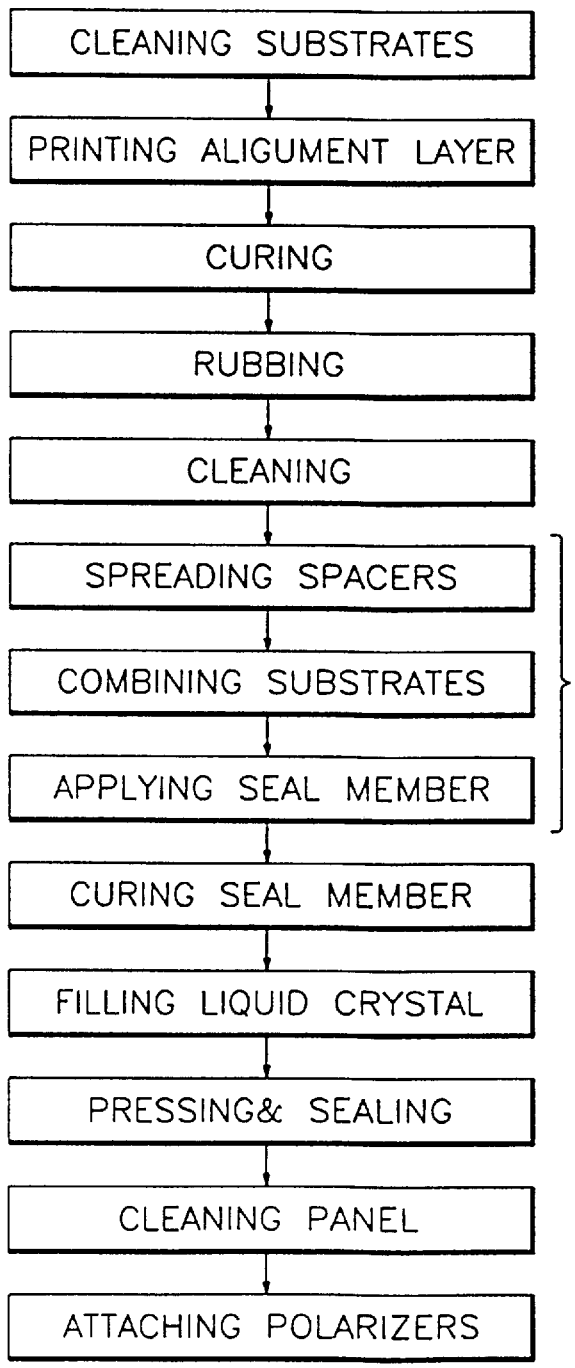
FIG. 3 is a flow chart illustrating a fabricating procedure of a preferred embodiment of the present invention.

As shown in FIG. 3, the substrates 2 and 2' are initially cleaned (step 302). In this cleaning step the substrates 2 and 2' are twice subjected to an ultrasonic cleaning in pure water for 20 minutes each and are then dipped into flowing pure water to be rinsed. The surfaces of the substrates 2 and 2' are then blown by an air jet to remove water off the surfaces, dried in a clean oven at 120° C. for 30 minutes, and return to room temperature by standing and cooling.

The cleaned substrates 2 and 2' are coated with an alignment layer (step 304). This alignment layer is preferably a polyimide such as RN-1067 (a product ex Nissan Kagaku K. K. Japan). The alignment layer is preferably deposited by a spinner method in order to form a pair of opposite film of 600 Å and then heated on a hot plate at 60° C. to evaporate the solvents.

The substrates 2 and 2' are heated at 200° C. for 30 minutes in a clean oven to polymerize the polyimide film. The substrates 2 and 2' are treated by uni-directional rubbing in order to align liquid crystal molecules in the rubbing direction. As velvet cloth is commonly used for rubbing, the fluffy impurities from the cloth easily attach onto the surface of substrates 2 and 2', and necessitates the cleaning post rubbing, wherein the procedure comprises two times of ultrasonic cleaning in pure water for 20 minutes each, rinsing with a flow of pure water, blowing the surface with an air jet, drying in a clean oven at 60° C. for 30 minutes, and cooling in an atmospheric environment.

Figure 4:
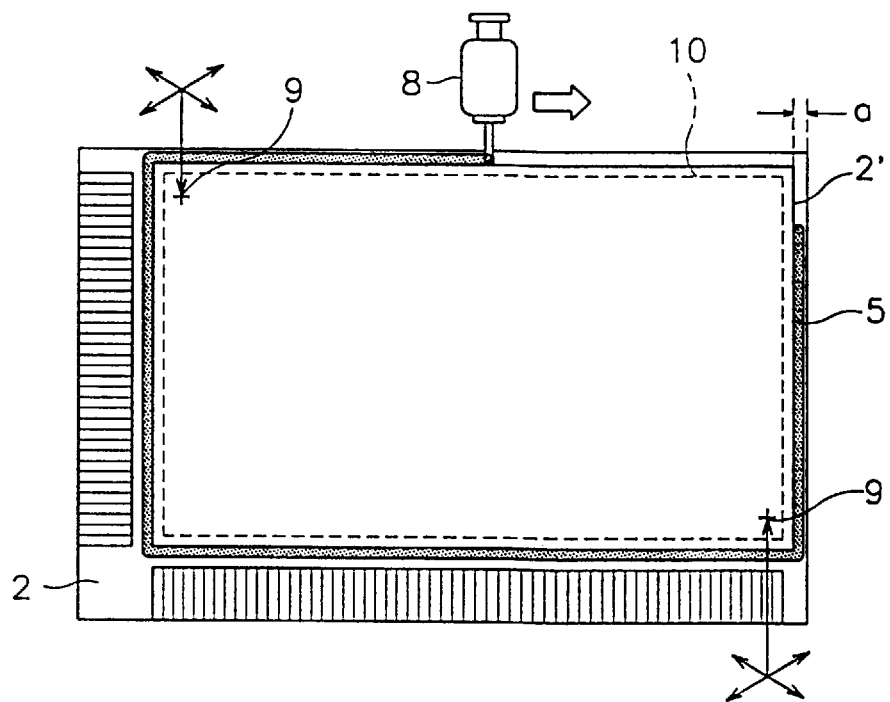
FIG. 4 is a plane view illustrating a fabricating procedure of an embodiment according to the present invention.

In conventional fabricating method as illustrated in FIG. 3, the substrates 2 and 2' after rubbing and cleaning are put to printing a seal member 5. However, in an embodiment according to the present invention, as shown in FIG. 4, spreading a plurality of spacers 6 precedes the step of forming the seal member 5. A product of Sekisui Fine Chemical in Japan (brand name: MICROPAR) is used for the spacers, specifically having a diameter of about 5.0 $\mu$m.

The substrate 2 is put into a chamber filled with acryl gas, then the acryl gas is further supplied to a container holding the spacers 6 and connected to a gas inlet of the chamber, thereby the spacers 6 being spread on the surface of the substrate 2.

The next step according to an embodiment of the present invention is combining both substrate 2 and 2', which is described below in detail with reference to FIG. 5 and FIG. 6.

The lower substrate 2 and upper substrate 2' are held with a vacuum at a lower stage 11 and upper stage 10 respectively.

The upper stage 10 is designed smaller than the lower stage 11 by the range of 1 mm–10 mm, preferably by about 2 mm.

Figure 8:
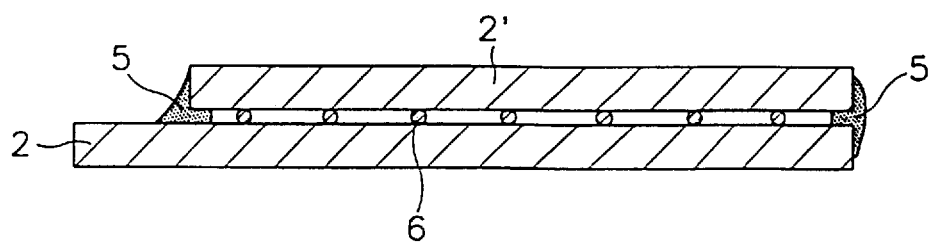

The upper substrate 2' is pressed onto the lower substrate 2 during position marks 9 being aligned to a predetermined position. In this step, the upper substrate 2' is positioned 0.5 mm–4 mm within the boundary edge of the lower substrate 2, preferably 1 mm, as indicated by 'a' in FIG. 5. However, as illustrated in FIG. 8 and FIG. 9, from one to three sides of the substrates 2 and 2' can be in alignment and the lower substrate 2' oversized only at the other sides.

The pressure on the upper substrate 2' is in the range of 0.05–0.5 kg/cm2, preferably about 0.08 kg/cm2, which is lower than the pressure of around 0.5–0.8 kg/cm2 required in conventional arts. The benefit of a lower pressure requirement is effected by the rearranged procedure of the present invention, wherein the pressure is applied prior to forming a seal member 5.

While the substrates 2 and 2' are pressurized, their position is aligned and simultaneously a seal member 5 is dispensed around the upper substrate 2' by means of a simple dispenser similar to a syringe, as shown in FIG. 5. The seal member 5 is then cured by irradiating ultraviolet light. An example of a seal member 5 commercially available is TB-3051, a product of Three Bond, Japan, which is an adhesive of ultraviolet curing type.

Other examples for the seal member 5 include an epoxy resin of conventional use, other resins of high sealing characteristics, and tapes.

In the forming the seal member 5, if the side areas of the substrates 2 and 2' are uneven, or make a certain angle with the aligning surface as shown in FIG. 8, enlarged the contacting area of the seal member 5 and the substrates 2 and 2' enhances the adhesiveness.

After the seal member is cured, the pressure on the upper substrate 2' and the vacuum are purged to atmospheric pressure.

Filling liquid crystal is accomplished through a procedure of putting the void cell and a liquid crystal in an evacuated chamber, dipping a filling port of the cell into the liquid crystal, and releasing the pressure in the chamber to the atmosphere. The pressure difference forces the liquid crystal to fill into the cell.

An example of liquid crystal material is fluoro compound ZLI-4792, a product of MERCK, U.S.A.

To obtain a constant cell spacing, both planes of the cell are subjected to pressure of about 0.6 kg/cm2 for 30 minutes, whereby some of the liquid crystal in the cell is squeezed out and at the same time, the unevenness and distortion of the glass substrate 2 and 2' are eliminated.

At this state, the adhesive, TB-3051 of Three Bond Company, is applied at the injection port and cured under ultraviolet light to seal off the injection port.

The liquid crystal cell which is filled with liquid crystal is washed with neutral detergent, rinsed with pure water, blown by an air jet to remove water droplets on the surface, dried in a clean oven at 60° C. for 30 minutes, and finally cooled to room temperature.

As a final step of fabricating a liquid crystal cell, a pair of polarizers 1 are attached on both faces of the cell.

A liquid crystal cell fabricated according to above description has such a structure as shown in FIG. 7, FIG. 8, or FIG. 9. As illustrated in the drawings, a plurality of spacers are spread within the gap of an upper substrate 2' and a lower substrate 2 which is larger than the upper substrate 2', a seal member 5 being applied along the boundary edge of the upper substrate 2'.

In FIG. 7, two sides of the upper substrate 2' are positioned within the boundary edges of the lower substrate 2.

In FIG. 8 and FIG. 9, one side of the upper substrate 2' is in alignment with one side of the lower substrate 2.

The sealed feature of FIG. 8 differs from that of FIG. 9 in view of contacting area, FIG. 8 illustrating a larger area than FIG. 9, such that both sides of the upper substrate 2' and one side of lower substrate 2 are cut in an angle.

A liquid crystal cell, fabricated by a method according to an embodiment of the present invention, is measured for the precision of alignment to obtain the result of: the deviation of 2 $\mu$m at maximum and 1 $\mu$m in average in case of FIG. 7 and FIG. 8, and 3 $\mu$m at maximum and 2 $\mu$m in average in case of FIG. 9, which shows a great improvement in comparison with the deviation of 5 $\mu$m–6 $\mu$m in conventional arts.

According to an embodiment of the present invention, a seal member is formed along the boundary edge of a substrate after both substrates being aligned, and consequently, special high-priced equipment such as a printer and a printing screen are not required, while a low-priced dispenser of syringe-type can be used for forming a seal member precisely.

Because a seal member is formed after the alignment of substrates, there is no need for pressurizing the seal member after it is formed, and instead a reduced pressure is applied during seal member formation. Accordingly, the movement of the substrates is reduced, so that conventional problems of damaging some pixels and leaking lights are decreased to effect an improvement of aligning and fixing the substrates.

Whereas an area of 3 mm–4 mm width from the sides of aligned substrates is required for the seal member in prior arts, an embodiment according to the present invention requires only about 1 mm width because the seal member is formed along the side area, thereby a display area is enlarged in comparing to prior arts. Furthermore, in case of FIG. 8 and FIG. 9, some of the sides of the substrates are aligned, and substantially more area is available for display than the case of FIG. 7.

The fabricating method according to an embodiment of the present invention enables substantial reduction of equipment cost and manufacturing cost of a liquid crystal cell.

What is claimed is:

1. A method for fabricating a liquid crystal cell comprising the steps of:
   a first step for spreading a plurality of spacers on an inner surface of a first transparent substrate provided with a plurality of electrodes; and
   a second step for forming a seal member along the boundary edge of a second transparent substrate provided with a plurality of electrodes after aligning said first substrate and said second substrate such that an inner surface of said second substrate face the inner surface of said first substrate.

2. The fabricating method according to claim 1, wherein the size of said first substrate is larger than the size of said second substrate.

3. The fabricating method according to claim 2, wherein said substrates are aligned such that at least one edge of said second substrate be positioned within the boundary edge of said first substrate.

4. The fabricating method according to claim 3, wherein said substrates are aligned such that at least one edge of said second substrate be positioned within 0.5 mm–4 mm of the boundary edge of said first substrate.

5. The fabricating method according to claim 2, wherein said substrates are aligned such that at least one edge of said first substrate is in alignment with an edge of said second substrate.

6. The fabricating method according to claim 1, wherein unevenness is formed at an edge and a side contacting with the inner surface of at least a substrate, said seal member being formed along the unevenness.

7. The fabricating method according to claim 6, wherein said unevenness is formed by cutting the edges of said substrates.

8. The fabricating method according to claim 7, wherein said edges being cut make an angle of 30–45 degree with said inner surface.

9. The fabricating method according to claim 7, wherein one or two edges of said first substrate are cut, and all edges of said second substrate are cut.

10. The fabricating method according to claim 1, wherein a seal member is formed under pressure applied to said substrates.

11. The fabricating method according to claim 10, wherein the pressure applied to said substrates is in the range of 0.05 kg/cm2–0.5 kg/cm2.

12. The fabricating method according to claim 10, wherein said seal member is an ultraviolet curing type.

13. The fabricating method according to claim 12, wherein a simple dispenser of syringe-type is used for forming the seal member.

14. The fabricating method according to claim 13, further comprising the step of applying a ultraviolet light after the step of forming the seal member.

15. The fabricating method according to claim 10, wherein said seal member is an epoxy resin, or a tape-shaped resin.

16. The fabricating method according to claim 1, wherein said second step comprises the steps of:
   holding the first substrate and the second substrate on the first stage and the second stage with vacuum respectively;
   aligning the position of the second substrate by applying pressure and simultaneously forming said seal member; and
   relieving the pressure from the second substrate, then purging the vacuum to release the first and the second substrates from the first and the second stages.

17. The fabricating method according to claim 16, wherein the dimension of said second stage is smaller than that of said second substrate by 1 mm to 10 mm.

18. The fabricating method according to claim 1, further comprising the step of filling liquid crystal in a space between two substrates after said second step.

19. The fabricating method according to claim 18, wherein said step of filling liquid crystal comprises:
   filling the liquid crystal through a filling port provided at a gap between the substrates; and
   pressing the substrates to squeeze out some of the liquid crystal and simultaneously to eliminate the roughness and distortion of the substrates, the filling port being sealed thereafter.

* * * * *